(12) United States Patent
Smith

(10) Patent No.: US 6,343,489 B1
(45) Date of Patent: Feb. 5, 2002

(54) BENDING RAIL BAND GUIDE

(75) Inventor: Larry Gene Smith, Tulsa, OK (US)

(73) Assignee: Visteon Global Technologies Inc., Dearborn, MI (US)

( * ) Notice: Subject to any disclaimer, the term of this patent is extended or adjusted under 35 U.S.C. 154(b) by 0 days.

(21) Appl. No.: 09/467,341

(22) Filed: Dec. 20, 1999

(51) Int. Cl.$^7$ .................. C03B 23/00; B65G 13/07; B65G 15/60; B65G 21/20; B65G 39/16
(52) U.S. Cl. .................. 65/286; 65/102; 65/106; 65/253; 65/370.1; 65/375; 65/374.13; 198/790; 198/840
(58) Field of Search .................. 65/102, 106, 281, 65/286, 253, 370.1, 375, 374.13; 198/790, 840

(56) References Cited

U.S. PATENT DOCUMENTS

| | | | |
|---|---|---|---|
| 3,659,696 A | * 5/1972 | Denton et al. | 198/790 |
| 3,958,684 A | * 5/1976 | Garzelloni | 198/790 |
| 3,967,718 A | * 7/1976 | Monahan | 198/790 |
| 4,074,805 A | * 2/1978 | Bodewes | 198/790 |
| 4,230,475 A | * 10/1980 | Dunk | 65/374.13 |
| 4,273,239 A | * 6/1981 | Thwaites et al. | 198/790 |
| 4,300,937 A | * 11/1981 | Rhonehouse | 198/790 |
| 4,353,458 A | * 10/1982 | Saur | 198/790 |
| 4,473,148 A | * 9/1984 | Saur | 198/790 |
| 4,512,460 A | * 4/1985 | McMaster | 198/790 |
| 4,743,285 A | * 5/1988 | McKelvey | 65/107 |
| 6,131,726 A | * 10/2000 | Hovsto et al. | 198/840 |

* cited by examiner

Primary Examiner—Michael Colaianni
(74) Attorney, Agent, or Firm—Larry I. Shelton

(57) ABSTRACT

A variable radius bending apparatus is disclosed for bending a glass plate. The variable radius bending apparatus includes a bending rail having a longitudinal rail member and a drive drum and a tension drum rotatably attached thereto. A drive band is positioned around the drive drum and tension drum and in frictional engagement therewith. A plurality of rollers are in driven contact with the drive band and are tiltable to a desired bend radius for forming the desired bend radius in the glass plate. Finally, a band guide is fixedly attached to the bending rail and in juxtaposition with the drive band for preventing the drive band from moving transversely with respect to the drive drum and tension drum, whereby the band is prevented from contacting a surface adjacent to the band.

12 Claims, 2 Drawing Sheets

BENDING RAIL BAND GUIDE

TECHNICAL FIELD

The present invention relates to glass bending equipment. The bending equipment includes a plurality of rollers which are driven by a steel band which is positioned around drive and tension drums. The entire assembly is contained within an oven or lehr.

BACKGROUND ART

Conventional methods for bending glass plates includes sliding the glass plate over a plurality of roller surfaces and subjecting the glass to temperatures of 430° C. The glass bending equipment is typically contained within a lehr or oven for sustaining the operating temperatures required to bend the glass plates. The glass bending equipment typically includes a set of drive and tension drums about which an Inconel steel band is placed. The steel band drives the plurality of rollers. The rollers are tilted at a desired angle to form a desired bending radius for the glass plates. The glass plates having an average temperature of 650° C. bend under the weight of the glass and the thermal stresses of the high temperature environment to the desired radius.

It has been observed that a significant problem of band abrasion and subsequent failure occurs due to the combination of thermal stresses and twisting forces on the bands. One method employed for overcoming the above-referenced problem is to crown the surface of the drums. Crowning of the drum surfaces causes the band to seek the center of the drum and acts to prevent transverse motion of the band. Although this technique works in some band and drum applications, it is inadequate under the severe high temperature conditions of the glass making processes to prevent the band from moving transversely with respect to the drum and causing severe edge abrasion of the band when the band hits adjacent surfaces.

Therefore, there exists a need for a device which will prevent the band from abrading against surfaces adjacent to the band and drums. Further, the device should not interfere with the linear velocity of the band or impart excessive forces upon the band.

DISCLOSURE OF INVENTION

Accordingly, it is an object of the present invention to provide an improved band guide to prevent the edges of the band from abrading against adjacent surfaces.

Another object of this invention is to provide a band guide which does not significantly reduce the linear velocity of the band while preventing the band from moving transversely with respect to a drive and tension drums about which the band is positioned.

In accordance with these and other objects, the present invention provides a variable radius bending apparatus for bending a glass plate. The variable radius bending apparatus includes a bending rail having a longitudinal rail member and a drive drum and a tension drum rotatably attached thereto. A drive band is positioned around the drive drum and tension drum and in frictional engagement therewith.

A plurality of rollers are in driven contact with the drive band and are tiltable to a desired bend radius for forming the desired bend radius in the glass plate. Finally, a band guide is fixedly attached to the bending rail and in juxtaposition with the drive band for preventing the drive band from moving transversely with respect to the drive drum and tension drum, whereby the band is prevented from contacting a surface adjacent to the band.

The advantages accruing to the present invention are numerous. For example, the present invention prevents the edges of the drive band from abrading against surfaces adjacent to the drive band. The present invention increases drive band life and correspondingly increases manufacturing productivity of glass-making equipment by reducing machine down time caused by drive band failure. Furthermore, the present invention is configured to include easily replaceable components to reduce machine repair time.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
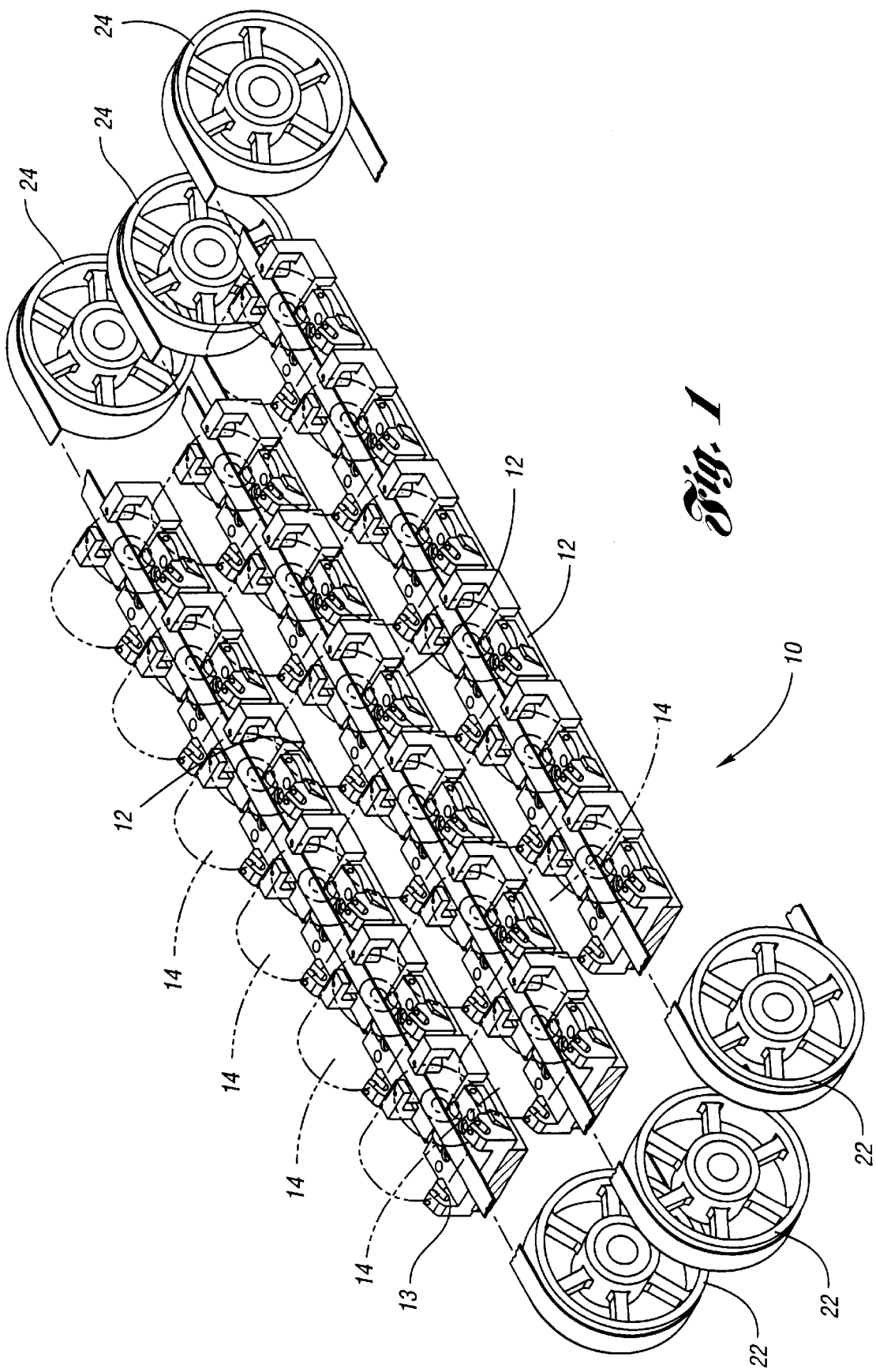
FIG. 1 is a perspective view of a VRB having a band guide means for preventing the bands from moving transversely with respect to the band drums, according to the present invention.

Referring now to FIG. 1, a perspective view of a Variable Radius Bending machine (VRB) 10 having a bending rail 12, according to the present invention. VRB 10 is used for creating a bend in glass plates such as tempered body glass used in automobiles. A plurality of rollers 14 contact the plate glass and are arranged at a specified tilt angle to produce the desired bend in the plate glass. Rollers 14 are driven by a steel band 20 which is preferably made from Inconel steel. Steel band 20 is positioned around two drums, a drive drum 22 and a tension drum 24. The drive drum 22 imparts a linear velocity to the steel band 20 while tension drum 24 creates a tensile force on the band. Typically, the average linear velocity of each band is 480 mm per second. The steel band typically has a thickness of 0.008 inches and a width of 0.5 inches. The entire bending rail portion of the VRB 10 is contained within a lehr or oven. The oven or lehr operates at an average temperature of 430° C.

In operation, a hot glass plate with an average temperature of 650° C. is fed onto the plurality of rollers 14 which are tilted at a specified bend radius for providing a bend in the plate glass. As the glass plate is rolled into the lehr over top of the rollers a continuous bend is created in the plate glass. The thermal stress and forces created by the rollers loaded down by the glass causes the bands to move transversely with respect to the drums. This transverse movement in the bands causes the edge of the bands to contact adjacent surfaces of the VRB 10. Contact with the adjacent surfaces causes abrasion of the band edges and subsequent band failure. Failure rates of up to one band a week has been observed. Significant repair time and reduction in VRB productivity results for each band failure. To address this problem, a band guide 40 is positioned between the drive drum 22 and the tension drum 24 of the VRB 10 to prevent the band 20 from moving transversely and hitting adjacent surfaces of the VRB, as will be described in further detail hereinafter. As shown in FIG. 1, a plurality of band guides may be used to limit transverse movement of the steel band 20.

Figure 2:
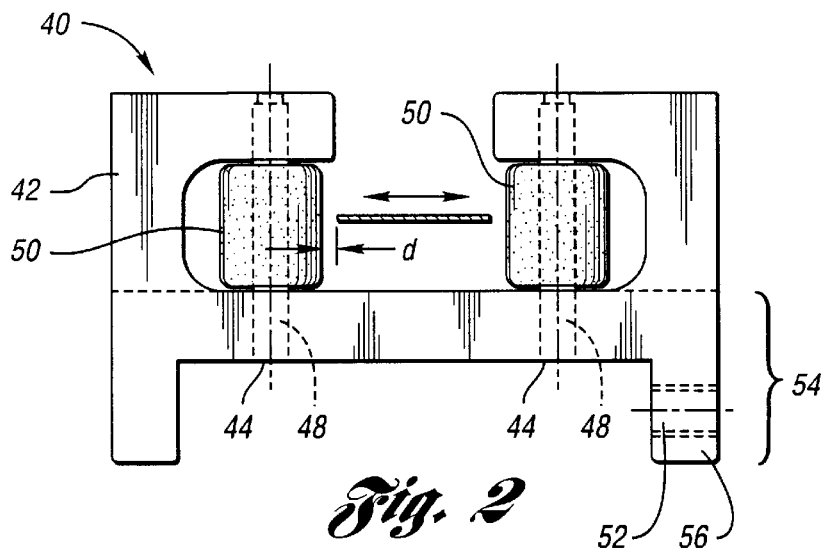
FIG. 2 is a perspective view of the band guide device for preventing transverse movement of the band, according to the present invention.

Reference is now made to FIG. 2 which is a front view of a band guide 40, according to the present invention. Band guide 40 includes a frame 42 having a plurality of apertures 44 for receiving rods or fasteners. A pair of rods 48 capture a pair band guide rollers 50 which are rotatable about the rods 48. Further, an aperture 52 is provided for receiving a set screw for attaching the frame 42 to the bending rail 12 of the VRB 10.

The band guide rollers 50 which are rotatably held in place by rods 48 are preferably made of ceramic material. The ceramic material is used to prevent thermal stress created by the contact of the drive band with the band guide rollers from degrading the rollers. The rollers are positioned on both sides of the drive band and have a clearance distance d with the edges of the drive band such that transverse movement (as indicated by the arrows) of the drive band will be limited sufficiently to prevent contact of the edges of the drive band with adjacent surfaces (as shown in FIG. 1). The rollers may experience wear and require maintenance. However, the maintenance cost in time and materials is far less than the maintenance cost in time and materials for replacing a drive band.

With continuing reference to FIG. 2, a C-channel portion 54 of frame 42 is illustrated. The C-channel portion 54 is configured to be removably fixed to the bending rail. A set screw aperture is disposed on one leg 56 of the C-channel and receives a set screw for locking frame 42 to the bending rail 12. The entire band guide 40 may be quickly and easily removed from the bending rail 12 for maintenance purposes by simply unscrewing the single set screw.

Figure 3:
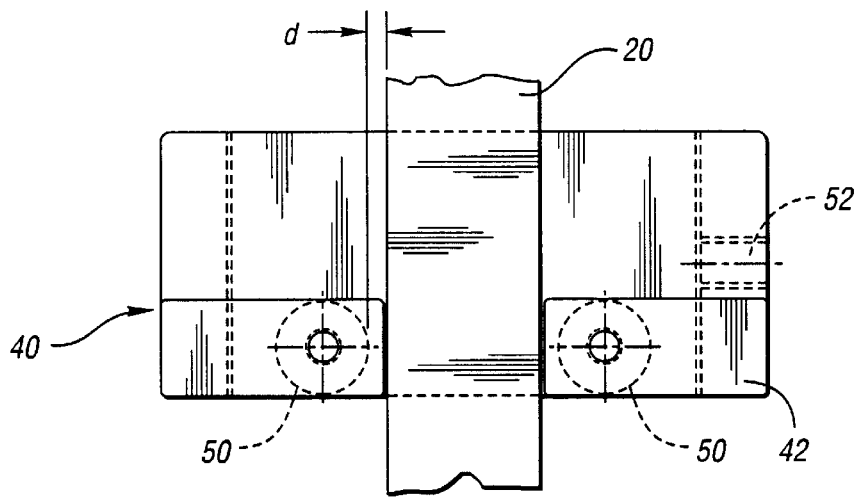
FIG. 3 is a top view of the band guide device, according to the present invention.

As illustrated in FIG. 3, a top view of the guide is shown, according to the present invention. Steel band 20 is shown disposed between the band guide rollers 50. As steel band 20 moves longitudinally, forces created by the rollers 14 loaded down by the glass plates cause transverse movement of the band 20. This transverse movement of the band causes the band to contact the band guide rollers 50. Band guide rollers 50, being freely rotatable about the rods 48, cause a negligible amount of drag on the steel band and prevent the band from abrading against surfaces 13 (shown in FIG. 1) adjacent to the steel band.

Figure 4:
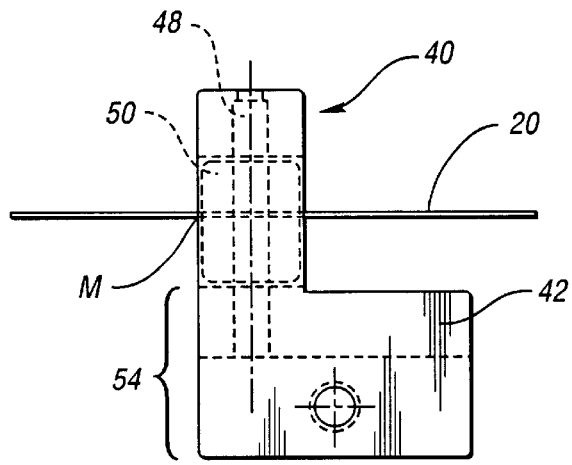
FIG. 4 is a side elevation view of the band guide device, according to the present invention.

Referring now to FIG. 4, a side elevation of the band guide, according to the present invention is illustrated. The steel band is preferably positioned vertically at a mid-point M of the band guide rollers 50. The L-shaped configuration of frame 42 is shown. As the drive band contacts the rollers, a rotational force may be exerted on the frame 42. The L-shaped configuration of frame 42 prevents the band guide assembly from rotating substantially, thereby reducing any drag forces created by the contact of the drive band 20 with the rollers 50.

Therefore, the present invention overcomes the shortcomings of the prior art by providing a band guide device which prevents the edges of the drive band from abrading against surfaces adjacent to the drive band. The present invention increases drive band life and correspondingly increases manufacturing productivity of glass making equipment by reducing machine down time caused by drive band failure. Furthermore, the present invention is configured to include easily replaceable components to reduce machine repair time.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A variable radius bending apparatus for bending a glass plate, the variable radius bending apparatus comprising:
    a bending rail having a longitudinal rail member and a drive drum and a tension drum rotatably attached thereto;
    a drive band positioned around the drive drum and tension drum and in frictional engagement therewith;
    a plurality of rollers in driven contact with the drive band and tiltable to a desired bend radius for forming the desired bend radius in the glass plate; and
    a band guide fixedly attached to the bending rail and in juxtaposition with the drive band for preventing the drive band from moving transversely with respect to the drive drum and tension drum, whereby the drive band is prevented from contacting a surface adjacent to the drive band and wherein there is a clearance distance between the drive band and the band guide.

2. The apparatus of claim 1 wherein the band guide is located between the drive drum and the tension drum.

3. A variable radius bending apparatus for bending a glass plate, the variable radius bending apparatus comprising:
    a bending rail having a longitudinal rail member and a drive drum and a tension drum rotatably attached thereto;
    a drive band having a width positioned around the drive drum and tension drum and in frictional engagement therewith;
    a plurality of rollers in driven contact with the drive band and tiltable to a desired bend radius for forming the desired bend radius in the glass plate; and
    a band guide fixedly attached to the bending rail and in juxtaposition with the drive band for preventing the drive band from moving transversely with respect to the drive drum and tension drum, whereby the band is prevented from contacting a surface adjacent to the band wherein the band guide further comprises a pair of band guide rollers rotatably fixed to the band guide and wherein the distance between the band guide rollers is greater than the width of the drive band.

4. The apparatus of claim 3 wherein the band guide comprises an L-shaped frame for mounting the band guide rollers thereto.

5. The apparatus of claim 3 wherein the band guide rollers are made of a ceramic material to prevent thermal degradation of the band guide rollers.

6. The apparatus of claim 1 wherein the band guide further comprises an C-channel portion for removable affixing the band guide to the bending rail.

7. The apparatus of claim 6 wherein the C-channel portion further comprises a set screw aperture for receiving a set screw to lock the band guide to the bending rail.

8. A band guide device for guiding a drive band having a width in a variable radius bending machine, the variable radius bending machine includes a bending rail having a longitudinal rail member, a drive drum and a tension drum rotatably attached thereto, the drive band is positioned around the drive and tension drums and is in frictional engagement therewith, and a plurality of rollers are in driven contact with the drive band and are tiltable to a desired bend radius for forming the desired bend radius in the glass plate, the band guide device comprising:

a frame; and a pair of band guide rollers separated by a distance greater than the width of the drive band rotatably fixed to the frame for preventing the drive band from moving transversely with respect to the drive drum and tension drum, whereby the drive band is prevented from contacting a surface adjacent to the drive band.

9. The device of claim 8 wherein the frame further comprises an L-shaped frame for mounting the band guide rollers thereto.

10. The device of claim 8 wherein the band guide rollers are made of a ceramic material to prevent thermal degradation of the same.

11. The device of claim 8 wherein the frame further comprises an C-channel portion for removable affixing the band guide to the bending rail.

12. The apparatus of claim 11 wherein the C-channel portion further comprises a set screw aperture for receiving a set screw to lock the band guide to the bending rail.

* * * * *